Patented Nov. 16, 1937

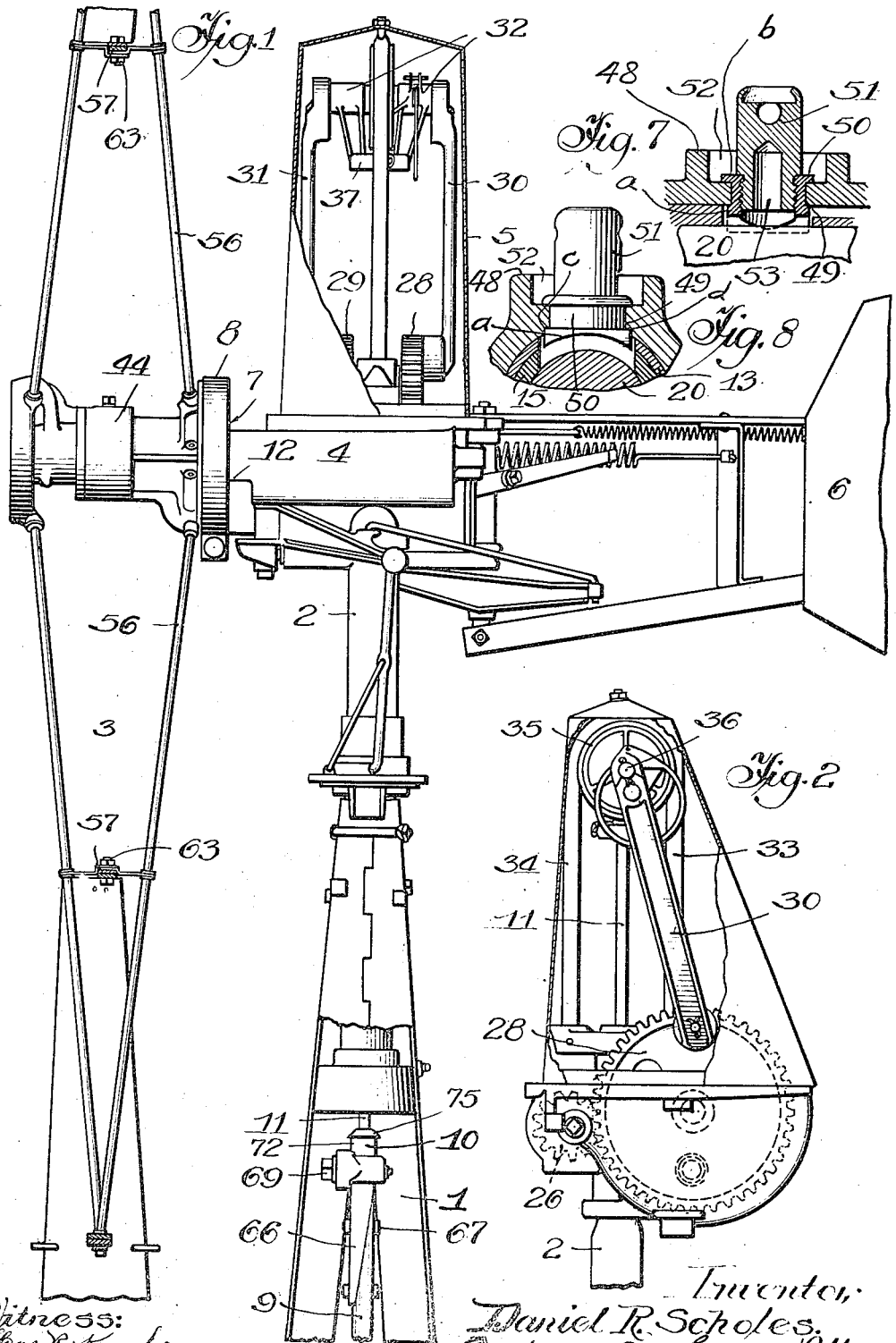

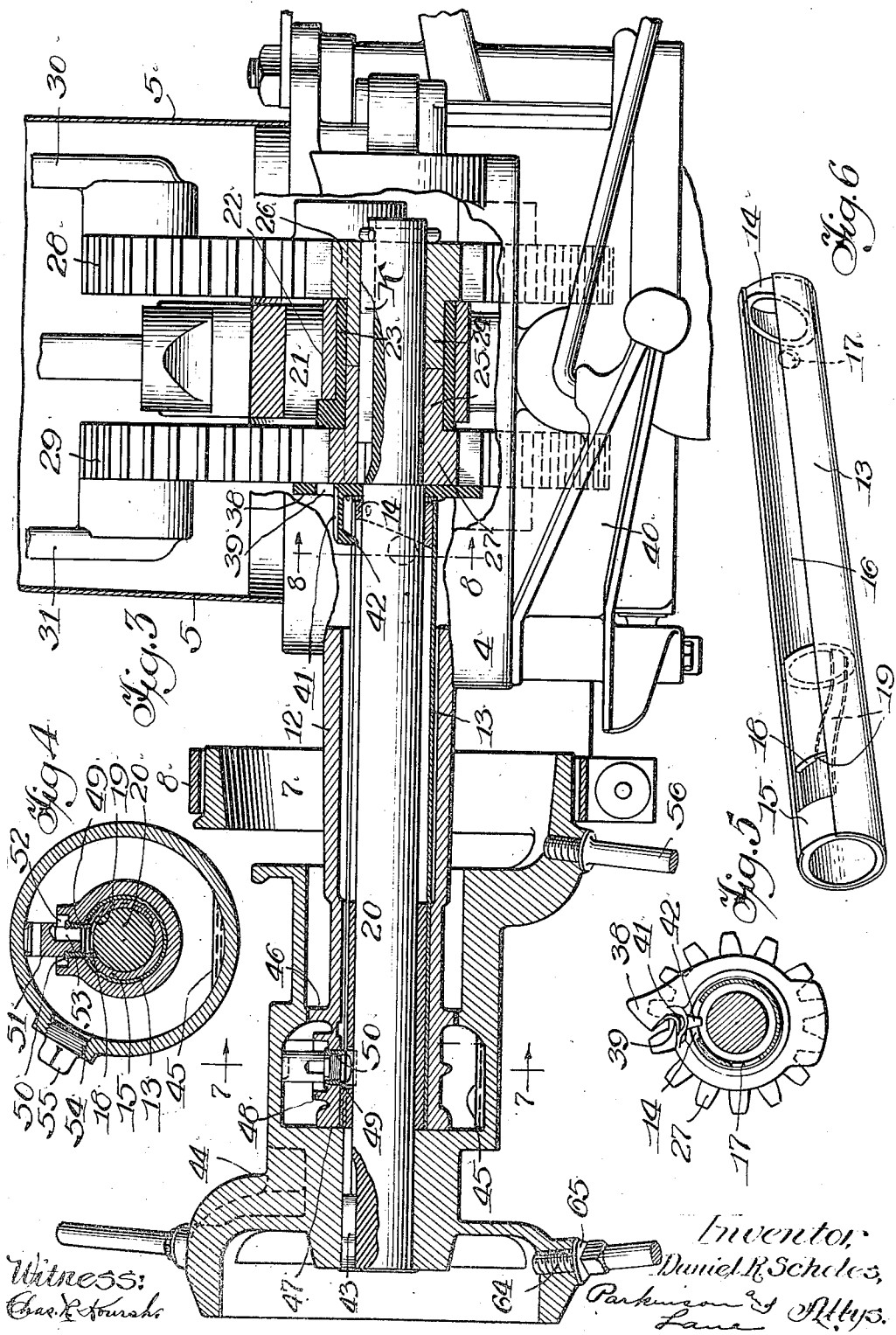

2,099,036

UNITED STATES PATENT OFFICE 2,099,036

POWER TRANSMITTING AND LUBRICATING MECHANISM

Daniel R. Scholes, Oak Park, Ill., assignor to Aermotor Company, Chicago, Ill., a corporation of Illinois Application December 29, 1933, Serial No. 704,428

3 Claims. (Cl. 184—4)

This invention relates to power transmitting mechanism and lubricating means for facilitating the lubrication of parts thereof.

Another object is to provide improved lubricating means for power transmitting mechanism.

A further object is to provide a novel arrangement of lubricating tube or trough in combination with an improved arrangement of bearings, and means for constantly lubricating such bearings and associated parts while the mechanism is in operation.

A still further object is to provide an improved delivery means for supplying oil to the tube or trough in combination with an improved oil collector for returning the oil to the source of supply.

A further object is to provide means cooperating with the oil collector to locate the latter during assembly and to direct the oil from the oil collector into the inside of the oil trough.

A still further object is to provide in windmill construction an improved main frame with bored bearing sockets and a key seat for the socket of the oil collector.

Other objects, advantages and capabilities will later more fully appear.

My invention further resides in the combination, construction and arrangement of parts shown in the accompanying drawings, and while I have illustrated therein preferred embodiments it is to be understood that the same are susceptible of modification and change without departing from the spirit of my invention.

In the drawings:—

Fig. 1 is a side elevation with parts broken away, and parts shown in section of the upper portion of a windmill embodying my invention.

Fig. 2 is a side elevation partly in section of the gear casing and the gearing and associated parts contained therein.

Fig. 3 is a vertical longitudinal section taken on a vertical plane passing through the axis of the windmill shaft, with the latter shown in elevation except for certain parts shown in section for the sake of clearness.

Fig. 4 is a vertical transverse section taken on the line 7—7 of Fig. 3, looking in the direction of the arrows.

Fig. 5 is a vertical transverse section taken on the line 8—8 of Fig. 3, and looking in the direction of the arrows.

Fig. 6 is a perspective view of the bearing tube with its contained bearings.

Fig. 7 is a detail sectional view of the oil collector, the oil collector socket and associated parts.

Fig. 8 is a fragmentary sectional view through the mounting for the oil collector socket, taken at right angles to the plane of Fig. 7.

Referring in detail to the drawings and more particularly to Fig. 1, there is provided the tower 1 of which only the upper portion is shown, it being understood that this tower can be of any desired height. The invention here involved will be described in connection with a windmill, the mill proper being operatively mounted at the top of the tower. Mounted at the top of the tower is the pipe 2, upon which is rotatably mounted the driving mechanism and the wind wheel, the latter being designated generally at 3. The driving mechanism is operatively mounted within the casing 4, and hood or helmet 5. The tail 6 is of the usual construction for holding the wind wheel into the wind, and has associated therewith the usual furling mechanism, which will not be described in detail as it forms no part of the present invention. Suffice it to say that when this furling mechanism is operated the tail is thereby swung into a plane substantially parallel with the plane of the wind wheel and throws the wind wheel edgewise to the wind and, if necessary, a greater or less braking action can be brought into play through the medium of the brake drum 7 and brake band 8 to prevent any rotation of the wind wheel.

Casing 4 houses the gearing mechanism shown more in detail in Figs. 1, 2 and 3, and extending laterally from this gear casing 4 is the hollow laterally extending member 12, in which is fixedly mounted the metallic tubular member 13 shown in perspective detail in Fig. 6. Fixed in the right-hand end of this tubular member 13 is the oil seal bearing 14, formed of Babbitt metal or other suitable bearing material. Fixed in the left-hand end of this tubular member 13 is the bearing 15, formed of similar bearing material to that of bearing 14. These bearing members are preferably cast in place within tubular member 13. Between the bearings 14 and 15 the tubular member 13 is provided with a longitudinal opening 16 which, due to the tubular member 13 being fixedly mounted in the laterally extending hollow member 12, is always positioned at the top. The right-hand edge of oil seal bearing 14 is vertical, while the left-hand edge is formed on an inclination, just to the left of which is the opening 17, which is formed in the side of the hollow tubular member 13 at a predetermined height to determine the oil level in the tubular member 13.

The bearing 15 at the left-hand end of tubular member 13 is formed with an opening 18 for a purpose to be hereinafter described, and from this opening 18 and extending at a slight angle longitudinally of tubular member 13 is a channel or passageway 19, through which the oil or lubricant will be returned to the interior of tubular member 13 from the lubricant receiving chamber surrounding the left-hand end of tubular member 13 and laterally extending member 12, hereinafter more fully described.

The wind wheel shaft 20 is rotatably mounted in bearings 14 and 15, the right-hand end of this shaft extending into gear casing 4 in a suitable bearing in that portion 21 of the main frame positioned within the gear casing, the portion 21 of the main frame being formed with the tubular portion 22, which is bored to receive the bearing 23 of Babbitt metal or other suitable material, in which bearing are positioned the inwardly extending hubs 24 and 25 of the driving pinions 26 and 27, which pinions are keyed by key K to shaft 20.

Meshing with driving pinions 26 and 27 are the driving gears 28 and 29, respectively, each of which is provided with a crank boss for rotatably connecting the lower end of the pitmans 30 and 31 to the driving gears, there being on the outer face of each of these driving gears 28 and 29 two of these crank bosses, positioned at different distances from the axis of the driving gears 28 and 29, in order that the throw of the pitmans may be changed as desired to effect a greater or less reciprocation of the cross-head 32, with which cross-head the upper end of each of the pitmans 30 and 31 is connected.

Fixed in the main frame are the stationary guide rods 33 and 34, (which are preferably formed from one piece of metal), in which is guided for longitudinal reciprocation the anti-friction wheel 35, which is rotatably mounted on the shaft 36 of the cross-head 32. Suitably secured to the lower end 37 of cross-head 32 is the pump rod 11 which, as described above, is connected to the pump pole 9 for imparting a vertical reciprocation thereto. As will be understood, the pump pole 9 is at its lower end secured in any desired manner to a pump mechanism to be operated by the windmill.

Loosely mounted on shaft 20, but fixed against rotation with relation to tubular member 13, is the oil delivering disk or plate 38, one face of which bears loosely against the left-hand face of pinion 27, the disk or plate 38 being formed with a cut-away portion 39, the edges of which collect oil carried upwardly by the teeth of gear wheel 29 from the oil bath in the bottom 40 of the gear casing 4, and which oil is transferred from said teeth to the pinion 27. This oil, which is carried up by the teeth of gear wheel 29 and wiped from the face of pinion 27 by the edges of opening 39 in the oil conveying disk 38 and other parts of the disk, is conveyed through trough 41 and down lip 42 through the slot 16 in the top of tubular member 13, and down into the interior of this tubular member. When the oil conveyed into the inside of tubular member 13 reaches a sufficient height it will flow through opening 17 and back into the oil bath in gear casing 4. Secured by a key 43 or other suitable securing means to the outer end of shaft 20, is the hub 44 of a wind wheel. This hub has a hollow portion forming the lubricant receiving chamber 45, the hub being suitably formed to coact with flange 46 near the left-hand end of the laterally extending hollow portion 12 to form one side wall of the lubricant receiving chamber 45. The hub 44 rotates with the wind wheel and bears at face 47 against the left-hand end of the laterally extending member 12.

Formed upon the upper surface of the left-hand end of laterally extending hollow member 12 and within the lubricant receiving chamber 45, is an annular upstanding flange 48, in the central portion of which is formed a vertically extending opening 49, in which is fixed the oil collector socket member 50, the lower end of which extends below the inner face of the laterally extending member 12, and into the opening 18 formed in bearing 15. This serves as means to locate these parts with relation to each other and to prevent any inadvertent rotation of the tubular member 13 within the laterally extending member 12. The oil collector socket 50 is formed on its lower end with a head $a$ (as seen in Figs. 7 and 8), and upon being inserted into opening 49 extends upwardly from this head $a$ in cylindrical form of a uniform diameter to the top. It is inserted into opening 49 from the left-hand open end of the hollow member 12 before either the tubular member 13 or the wind wheel hub 44 are positioned in place, by pushing it upwardly from the inside of hollow member 12 until the head $a$ strikes the bottom edge of the walls forming the hole 49. It is then held in place by a suitable anvil device of any desired shape or kind, and the upper edge of this oil collector socket 50 is then upset and deformed to form the flange $b$, flange $b$ and head $a$ thus holding it rigidly in position. The upper marginal surfaces of head $a$ are flat and seat into a flat seat which is formed in the laterally extending hollow member 12 at the lower end of opening 49. This enables two of the opposite edges of the upper face of head $a$ to be positioned in seats $c$ and $d$, and thus insures the proper positioning of head $a$ so that two of its sides will be parallel with the sides of the longitudinal opening 16 in the tubular member 13 when the latter is pushed into position, as later pointed out.

Screwed into the oil collector socket member 50 and extending upwardly therefrom is the oil collector 51, which is of a height to lightly wipe against the interior circumferential walls of the lubricant receiving chamber 45, which rotates with the hub 44. The oil thus wiped from the interior circumferential face of lubricant receiving chamber 45 is carried downwardly along the oil collector into the annular groove 52 formed between the annular flange 48 and the oil collector, from which groove the oil then passes through opening 53 (see Fig. 4) through the oil collector and down into opening 18 in bearing 15, and thence along the passageway 19 back to the interior of the tubular member 13.

From the above it will be seen that the bearings of the driving pinions 26 and 27, as well as the bearings of gears 28 and 29 and the bearings of the crank bosses at the lower ends of pitmans 30 and 31, and any other parts needing lubrication within the gear casing, will be thoroughly lubricated, and oil will be fed into tubular member 13 by disk or plate 38 described above. This oil inside of the tubular member 13 will flow to both of the bearings 14 and 15, thoroughly lubricating the same, and such oil as works to the left in Fig. 3 through bearing 15 will collect in the lubricant receiving chamber 45, thus lubricating the moving parts in this region of the mechanism.

It is also seen from the above that the oil will be carried upwardly on the inner face of the circumferential walls of the lubricant receiving chamber 45, a portion of which will be wiped therefrom by the oil collector 51 and be returned through this oil collector and oil collector socket member back through opening 18 and passageway 19 into the interior of tubular member 13, finding its way back to the oil bath in the gear casing 4, when the oil in tubular member 13 accumulates to sufficient height to run through opening 17.

To facilitate the insertion of the oil collector 51 into oil collector socket member 50, the hub 44 is provided with a threaded opening 54 which, when the hub is rotated to the desired degree, will fall opposite the position for the oil collector 51. The oil collector 51 can then be inserted through this opening 54 and screwed into place in the threaded opening in the oil collector socket. A plug 55 may be threaded into opening 54 to close the same after assembly of these parts. By rocking the hub back and forth the upper edges of the oil collector 51 can be forced into sliding engagement with the inner surface of the hub 44 which forms the circumferential walls of the lubricant receiving chamber 45.

A boring bar or other boring tool may be passed through the laterally extending member 12 before the shaft 20 or tubular member 13 are placed therein, and the part 21, and these parts be easily bored, the latter to receive the bearing metal 23 around the hubs of the driving pinions 26 and 27, and the former to receive the left-hand end of the tubular member 13.

The bearings 14 and 15 are preferably cast in place in tubular member 13, the entire circumference of bearing 14 being entirely within the inner circumference of tubular member 13. This is also true of that portion of bearing member 15 extending from the right-hand end of this bearing, as shown in Fig. 6, to the left-hand margin of opening 18, but from said margin the metal of bearing 15 fills up the space between the edges of longitudinal opening 16 to fall within the circle of the circumference of the outside of tubular member 13. After the oil collector socket 50 has been placed in position as described before, the tubular member 13 may be pushed longitudinally into position within the laterally extending hollow member 12, the longitudinal edges of the slot 16 in the top of tubular member 13 sliding along on each side of head *a* of the oil collector socket 50 until the metal forming the left-hand margin of opening 18 strikes head *a* of the oil collector socket. This head *a* of the oil collector socket in effect occupies what might be called a key seat in tubular member 13, and holds the latter against rotation with shaft 20.

The pressure of the wind against the wind wheel vanes will be such as to cause hub 44, as shown in Fig. 3, to tend to press in a right-hand direction.

Having now described my invention, I claim:—

1. In mechanism of the class described, a hollow stationary member, a tubular member slidable longitudinally into said hollow stationary member, a bearing fixed in said tubular member near one end, a second bearing fixed in said tubular member near the other end and having a lateral opening therethrough, a longitudinal slot extending along the upper edge of the tubular member from one end to near the other, an oil collector socket fixed near one end of the hollow stationary member and having a head extending a slight distance into the interior thereof, said head being fitted into a depressed seat to hold its sides parallel with said slot, said head being of a width slightly less than that of the slot, whereby the tubular member with its bearings may be inserted longitudinally into the hollow stationary member with the sides of the slot moving by the sides of said head until the end of the slot strikes the head, the head insuring that the tubular member can be inserted in only one position and held against rotation.

2. In mechanism of the class described, a hollow stationary member having an oil collector head projecting a slight distance into its interior, a tubular member having spaced bearing members fixed on its interior and a longitudinal slot in its upper side, whereby the tubular member with its bearings may be inserted longitudinally into the stationary member and be guided by the slot moving over the head.

3. In mechanism of the class described, a hollow stationary member, a tubular member fixed therein, a bearing member in said tubular member and having an opening therein, an oil collector socket in said hollow stationary member and extending into the opening in said bearing member to position the latter, a rotatable lubricant receiving chamber, an oil collector secured in said socket and wiping the interior circumferential surface of said chamber, said bearing member having an oil conducting passageway formed therein and extending from said socket to the interior of said tubular member, whereby the oil will be conducted along the oil collector, and through the oil collector socket and passageway to the interior of said tubular member.

DANIEL R. SCHOLES.